United States Patent
Ono

(10) Patent No.: US 8,282,293 B2
(45) Date of Patent: Oct. 9, 2012

(54) MIRROR BRAKE MECHANISM OF AN SLR CAMERA

(75) Inventor: Yoshinori Ono, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 12/966,155

(22) Filed: Dec. 13, 2010

(65) Prior Publication Data

US 2011/0158632 A1  Jun. 30, 2011

(30) Foreign Application Priority Data

Dec. 25, 2009  (JP) .................................. 2009-294671
Dec. 6, 2010  (JP) .................................. 2010-271872

(51) Int. Cl.
G03B 19/12 (2006.01)
G03B 17/00 (2006.01)
H04N 5/225 (2006.01)

(52) U.S. Cl. .......................... 396/358; 396/447; 348/374

(58) Field of Classification Search .................. 396/358, 396/354, 447, 453; 348/374
See application file for complete search history.

(56) References Cited

U.S. PATENT DOCUMENTS 4,385,820 A    5/1983  Shono
5,758,219 A *  5/1998  Arai .............................. 396/447

FOREIGN PATENT DOCUMENTS

JP    57-70524    5/1982

OTHER PUBLICATIONS

U.S. Appl. No. 12/966,137 to Yoshinori Ono, filed Dec. 13, 2010.

* cited by examiner

*Primary Examiner* — Rochelle-Ann J Blackman
(74) *Attorney, Agent, or Firm* — Greenblum & Bernstein, P.L.C.

(57) ABSTRACT

A mirror brake mechanism of an SLR camera for applying a brake to a mirror pivoted about a mirror rotational shaft to be swingable between a viewing position and a retracted position. The mirror brake mechanism includes a brake shaft which is independent of the mirror rotational shaft and positionally aligned along an extension line of the mirror rotational shaft; an interlocking rotating member disposed on one of laterally opposite sides of the mirror and rotatable about the brake shaft; a mirror drive shaft which connects a mirror seat, on which the mirror is mounted, and the interlocking rotating member to each other in a rotational direction about the mirror drive shaft; a brake drum which rotates in association with the interlocking rotating member; and a mirror brake member which is brought into contact with and disengaged from the brake drum.

11 Claims, 13 Drawing Sheets

MIRROR BRAKE MECHANISM OF AN SLR CAMERA

BACKGROUND OF THE INVENTION

1. Field of the Invention

The present invention relates to a mirror brake mechanism of an SLR camera equipped with a quick-return mirror that swings between a viewing position and a retracted position.

2. Description of the Related Art

The quick-return mirror (hereinafter referred to simply as a mirror) of an SLR camera swings between a viewing position, in which light traveling from a photographing lens is incident on the quick-return mirror and reflected thereby toward a viewfinder optical system, and a retracted position, in which the light traveling from the photographing lens is allowed to be incident on film or an image pickup device such as an image sensor without being reflected by the mirror. In 35 mm-format SLR compact cameras, it is typically the case that the mirror is simply made to bump against a mirror-up stopper to stop thereat when the mirror swings up from the viewing position to the retracted position; however, in medium format SLR cameras, the shock produced upon the mirror being retracted to the retracted position from the viewing position is great because the inertia of the mirror is great. Accordingly, a medium format SLR camera equipped with a mirror-up brake mechanism to reduce such a shock is known in the art, e.g., Japanese Unexamined Patent Publication No. S57-70524.

In the mirror brake mechanism disclosed in Japanese Unexamined Patent Publication No. S57-70524, a sector gear is integrally formed with a mirror seat (which holds the mirror) to extend toward the rear of the rotational shaft of the mirror seat, and a brake mechanism is installed in association with the sector gear. Due to this structure, an installation space for the mirror brake mechanism is required behind the mirror (mirror box), which is disadvantageous in regard to miniaturization of the camera.

SUMMARY OF THE INVENTION

The present invention has been devised based on an awareness of the above described issues in the mirror brake mechanism of conventional medium format SLR cameras and provides a mirror brake mechanism of an SLR camera which is configured to make it possible to reduce the thickness (length) of the camera.

In conventional mirror brake mechanisms of SLR cameras, since a sector gear is formed integral with a mirror seat to extend toward the rear of the rotational shaft of the mirror seat and since a mirror brake mechanism is installed in association with the sector gear, an installation space for the mirror brake mechanism is inevitably required behind the mirror box. By resolving this issue, the present invention has been accomplished from the viewpoint that, if an interlocking rotating member which rotates with the mirror seat and is positioned coaxially with the axis of rotation of the mirror seat is installed on one of laterally opposite sides of the mirror and if the interlocking rotating member is made to operate in association with the mirror brake mechanism, a degree of freedom is given to the placement of the mirror brake mechanism to thereby make it possible to reduce the thickness (length) of the camera.

According to an aspect of the present invention, a mirror brake mechanism of an SLR camera is provided for applying a brake to a mirror pivoted about a mirror rotational shaft to be swingable between a viewing position, in which light traveling from a photographing optical system is incident on the mirror and reflected thereby toward a viewfinder optical system, and a retracted position, in which the light traveling from the photographing optical system is allowed to be incident on an image sensor without being reflected by the mirror. The mirror brake mechanism includes a brake shaft which is independent of the mirror rotational shaft and positionally aligned along an extension line of the mirror rotational shaft; an interlocking rotating member disposed on one of laterally opposite sides of the mirror and rotatable about the brake shaft; a mirror drive shaft which connects a mirror seat, on which the mirror is mounted, and the interlocking rotating member to each other in a rotational direction about the mirror drive shaft; a brake drum which rotates in association with the interlocking rotating member; and a mirror brake member which is brought into contact with and disengaged from the brake drum.

It is desirable for the interlocking rotating member, the brake drum and the mirror brake member to be disposed on the one of the laterally opposite sides of the mirror.

If the interlocking rotating member includes an elongated hole elongated in a radial direction of the interlocking rotating member, wherein the mirror drive shaft is connected to a lateral side of the mirror seat and is inserted into the elongated hole of the interlocking rotating member, a deviation in coaxial alignment between the shaft (brake shaft) of the interlocking rotating member and the mirror rotational shaft of the mirror can be absorbed.

It is desirable for the interlocking rotating member to include a sector gear, and for the mirror control mechanism to include a speed-up gear train that is disposed between the sector gear and the brake drum.

It is desirable for the mirror brake member to include a brake lever that is swingable between a brake applying position in which a brake shoe fixed to one end of the brake lever is pressed against the brake drum to brake the brake drum and a brake release position in which the brake shoe is disengaged from the brake drum, and for the mirror brake mechanism to include a brake spring which biases the brake lever toward the brake applying position.

It is desirable for the mirror brake mechanism to include a mirror drive unit which swings the mirror via the mirror drive shaft.

It is desirable for the mirror drive unit to include an operatively associated mechanism which operates in association with the mirror drive unit to prevent the mirror brake member from applying a brake to the brake drum when the mirror is in the viewing position, to brake the brake drum before the mirror reaches the retracted position when the mirror swings from the viewing position to the retracted position, and to release the brake from the brake drum applied via the mirror brake member before the mirror commences to swing when the mirror swings from the retracted position to the viewing position.

It is desirable for axes of the brake shaft, the mirror drive shaft and the brake drum to be parallel to one another.

According to the present invention, since the interlocking rotating member that rotates with the mirror seat and is positioned coaxially with the axis of rotation of the mirror seat is installed on one of laterally opposite sides of the mirror and since the interlocking rotating member is made to operate in association with the brake drum that serves as an element of the mirror brake mechanism, the depth of the installation space for the mirror brake mechanism can be small, which makes miniaturization of the camera body possible.

The present disclosure relates to subject matter contained in Japanese Patent Applications Nos. 2009-294671 (filed on Dec. 25, 2009) and 2010-271872 (filed on Dec. 6, 2010), which are expressly incorporated herein by reference in their entireties.

DESCRIPTION OF THE PREFERRED EMBODIMENT

Figure 1:
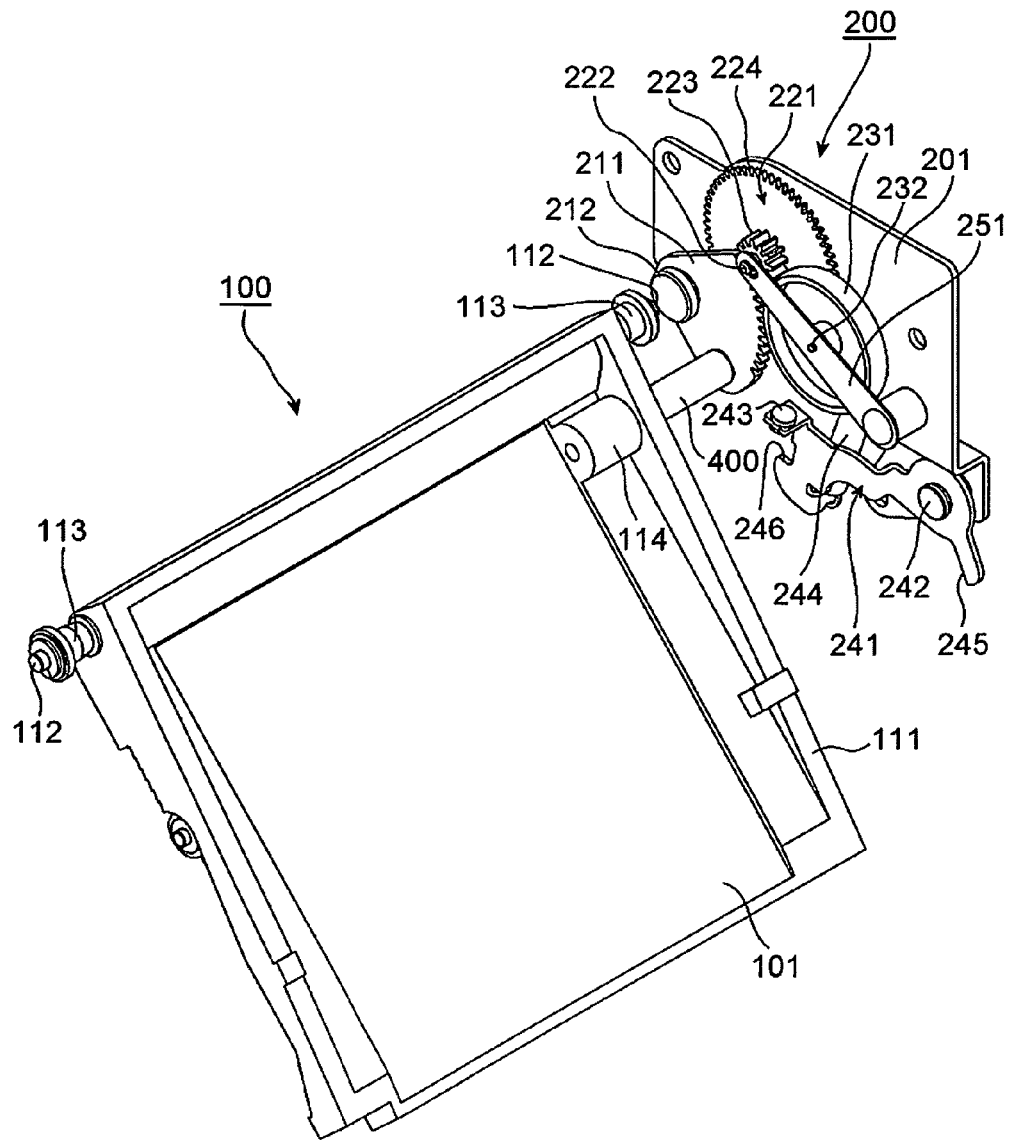
FIG. 1 is a perspective view of an embodiment of a mirror unit and an embodiment of a mirror brake unit of a mirror brake mechanism according to the present invention with a mirror drive unit removed from the mirror drive apparatus.
Figure 2:
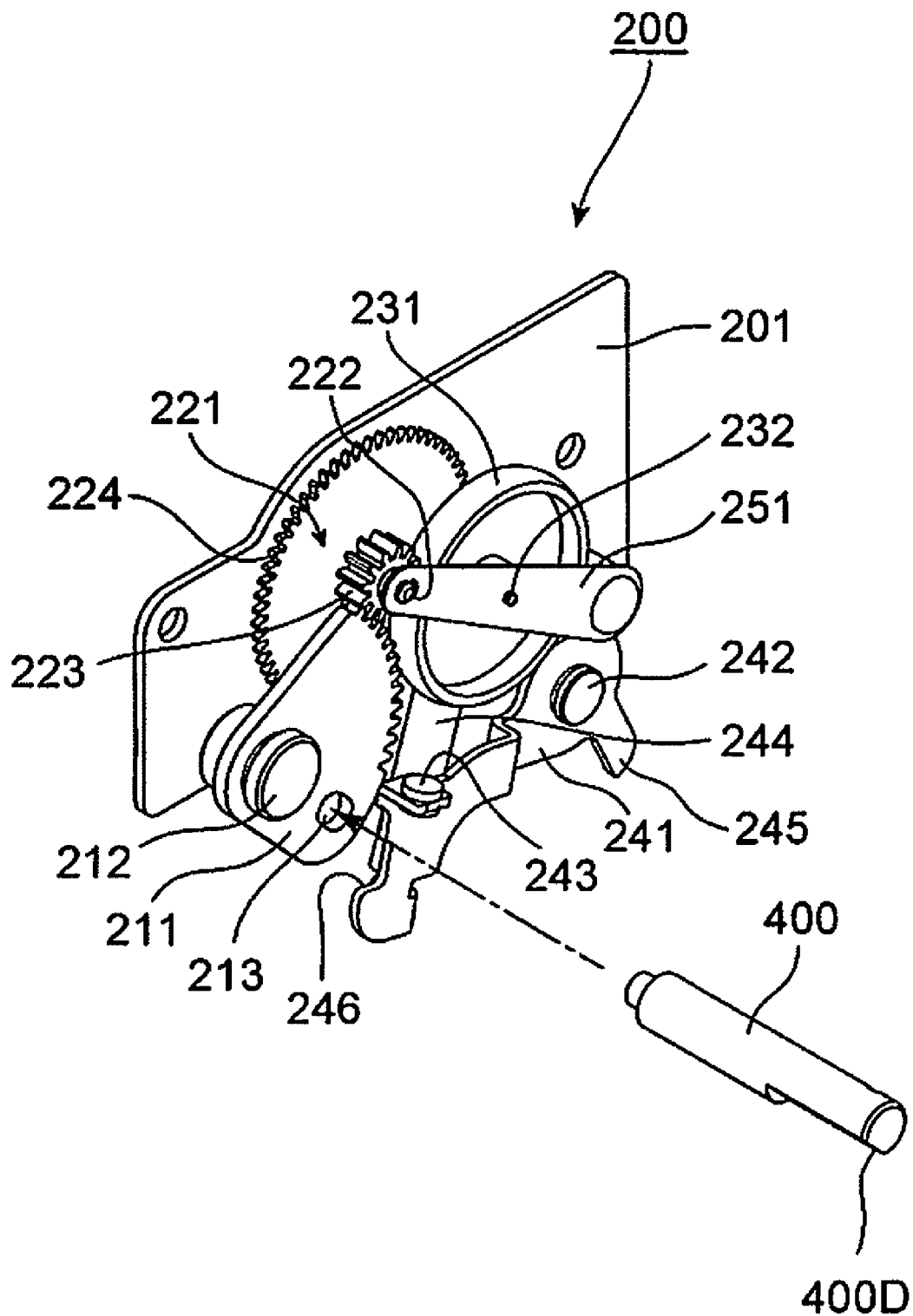
FIG. 2 is a rear perspective view of the mirror brake unit, showing the structure thereof.
Figure 3:
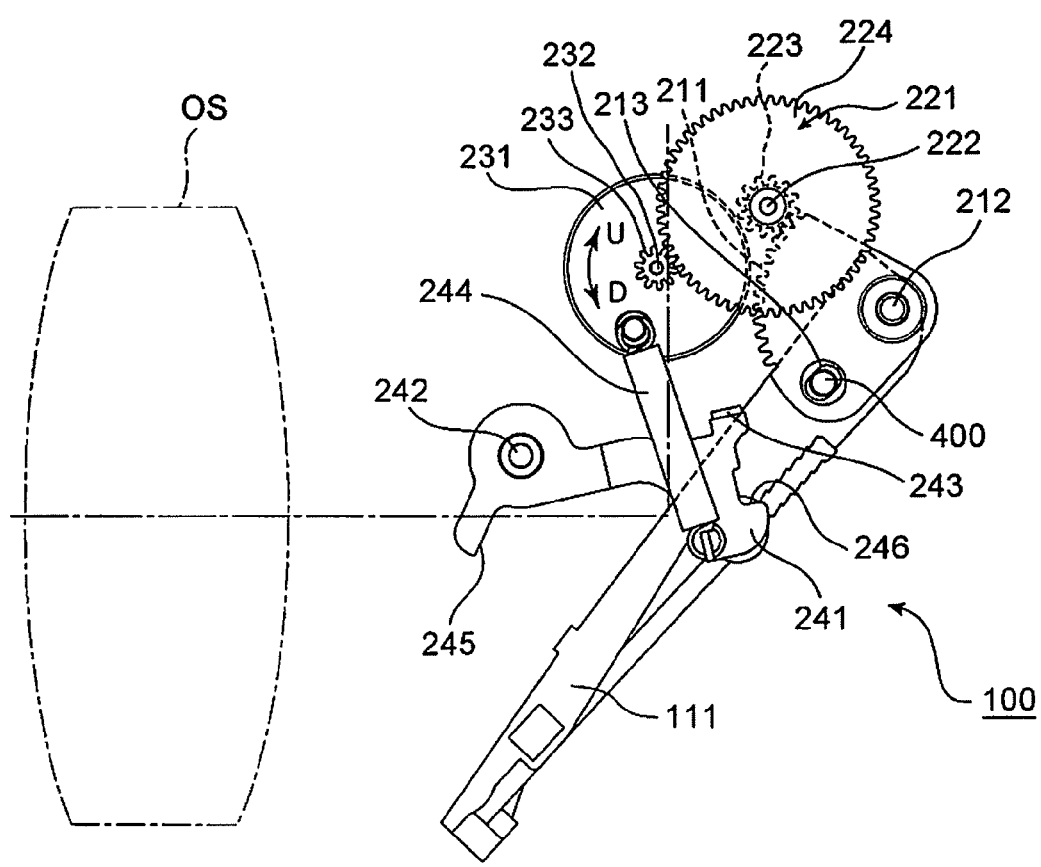
FIG. 3 is a side elevational view of the mirror unit and the mirror brake unit.

The illustrated embodiment of the mirror drive apparatus that is incorporated in a digital SLR camera is provided with a mirror unit 100, a mirror brake unit (mirror brake mechanism) 200 and a mirror drive unit (mirror drive mechanism) 300 which are constructed independently of one another. FIGS. 1 and 3 each show the mirror unit 100 and the mirror brake unit 200, FIG. 2 shows the mirror brake unit 200, FIGS. 4 and 5 each show part of the mirror unit 100 and the mirror drive unit 300 with the mirror brake unit 200 removed from the mirror drive apparatus, and FIGS. 6 through 10 show an assembled state of the whole mirror drive apparatus. Although the mirror brake unit 200 is provided with a brake mount plate 201, the brake mount plate 201 is not shown in FIGS. 6 through 10 for the sake of clarity. In the following descriptions, the components of the mirror unit 100 are designated by reference numerals in their hundreds, the components of the mirror brake unit 200 are designated by reference numerals in their two hundreds, and the components of the mirror drive unit 300 are designated by reference numerals in their three hundreds.

[Mirror Unit 100]

The mirror unit 100 is provided with a mirror (quick-return mirror) 101 and a mirror seat 111 in the shape of a substantially rectangular frame to which the mirror 101 is fixedly mounted. A mirror rotational shaft 112 is fixed to the mirror seat 111 so that both ends of the mirror rotational shaft 112 project in opposite directions away from each other from opposite sides of the mirror seat 111 at one end of the mirror seat 111. Two mirror shaft bearings 113 are rotatably fitted on both ends of the mirror rotational shaft 112, respectively. The mirror seat 111 is installed in a mirror box (not shown) via the mirror rotational shaft 112 and the mirror shaft bearings 113. In a state where this mirror box is mounted inside a camera body (not shown), the mirror 101 is pivoted about the mirror rotational shaft 112 to be swingable between a viewing position (shown in FIG. 3) at which object light traveling from a photographing optical system OS is incident on the mirror 101 and reflected thereby toward a viewfinder optical system (not shown) and a retracted position (photographing position) at which the light traveling from the photographing optical system OS is allowed to be incident on an image pickup device (image sensor) (not shown).

The mirror seat 111 is provided on one side thereof with a bearing (mirror drive shaft bearing) 114 which is positioned toward the free end of the mirror sheet 111 with respect to the mirror rotational shaft 112. A mirror drive shaft 400 is fitted in the bearing 114. The mirror drive shaft 400 is an element which connects the mirror seat 111 to each of the mirror brake unit 200 (a sector gear 211 thereof) and the mirror drive unit 300 (a mirror drive lever 311 thereof; see FIG. 4 and the following drawings). The mirror drive shaft 400 is provided with a D-cut cross-sectional portion 400D (see FIG. 2) which is inserted into the bearing 114 of the mirror seat 111. The mirror drive shaft 400 is fixed to the mirror seat 111 by a set screw (not shown) which is screwed into the bearing 114 in a radial direction thereof until the set screw contacts the flattened portion of the D-cut cross-sectional portion 400D.

[Mirror Brake Unit 200]

The mirror brake unit 200 is a mirror brake mechanism which applies a brake to the swing motion of the mirror seat 111, to which the mirror 101 is mounted. The elements of the mirror brake unit 200 are mounted to a brake mount plate 201 that is provided as a separate member from the aforementioned mirror box that supports the mirror shaft bearing 113 of the mirror seat 111.

The mirror brake unit 200 is provided with the sector gear (interlocking rotating member) 211 that is pivoted on the brake mount plate 201 via a brake shaft 212. The brake shaft 212 is positioned independently on an extension line of the axis of the mirror rotational shaft 112 in a state where the mirror unit 100 is combined with the mirror brake unit 200. The sector gear 211 is disposed so that the geared portion thereof is positioned further forward (toward the photographing optical system OS) than the brake shaft 212. An elongated hole 213 that is elongated in a radial direction of the sector gear 211 is formed on the sector gear 211 at a position a predetermined distance away from the brake shaft 212. The mirror drive shaft 400 of the mirror unit 100 is inserted into the elongated hole 213. The mirror seat 111 and the sector gear 211 are coupled (connected) to each other via the mirror drive shaft 400 in the rotational direction of the mirror seat 111 and the sector gear 211. The width of the elongated hole 213 is determined so as to remove play in the widthwise (minor axis) direction thereof between the elongated hole 213 and the mirror drive shaft 400. In addition, the distance between the center of the elongated hole 213 in the lengthwise direction thereof and the brake shaft 212 is determined to be substantially identical to the distance between the mirror rotational shaft 112 and the mirror drive shaft 400. By forming the elongated hole 213, in which the mirror drive shaft 400 is inserted, as a hole elongated in a radial direction of the sector gear 211 in the above described manner, a deviation in coaxial alignment between the mirror rotational shaft 112 and the brake shaft 212 can be absorbed.

The mirror brake unit 200 is provided with a speed-up gear (speed-up gear train) 221 and a brake drum 231, each of which is mounted to the brake mount plate 201. The sector gear 211 is in mesh with the brake drum 231 via the speed-up gear 221. More specifically, the speed-up gear 221 is provided with a small gear 223 and a large gear 224 which are formed integrally and coaxially with a shaft 222 that is rotatably supported by the brake mount plate 201. The small gear 223 and the large gear 224 are in mesh with the sector gear 211 and a small gear 233 (see FIG. 3) of the brake drum 231, respectively. The speed-up gear 221 and the brake drum 231 are rotatably supported by the brake mount plate 201 via the shaft 222 and a drum shaft 232, respectively. In addition, the speed-up gear 221 and the brake drum 231 are prevented from coming off the shaft 222 and the drum shaft 232, respectively, by a retaining plate 251 which is fixed at one end thereof to the brake mount plate 201. The small gear 223 and the large gear 224 of the speed-up gear 221, and the brake drum 231 that includes the small gear 233, which are arranged on the brake mount plate 201 and driven to rotate by the sector gear 211, are all positioned in front of the brake shaft 212. Specifically, in medium format SLR cameras, miniaturization (reduction in thickness) of the whole camera becomes possible by the above described arrangement in which the small gear 223, the large gear 224 and the brake drum 231 that includes the small gear 233 are all positioned in front of the brake shaft 212, i.e., on one side of the mirror box, since the mirror of a medium format SLR camera is generally large in size.

The mirror brake unit 200 is provided with a brake lever (mirror brake member) 241 which is pivoted about a brake lever shaft 242 fixed to the brake mount plate 201 so that the brake lever 241 can freely rotate about the brake lever shaft 242. The brake lever 241 is for applying a brake to the brake drum 231 while in motion. A brake shoe 243, which is brought into contact with the outer peripheral surface of the brake drum 231, is fixed to an end of the brake lever 241. Forward and reverse swing movements of the brake lever 241 about the brake lever shaft 242 cause the brake shoe 243 to correspondingly move toward and away from the brake drum 231. The brake drum 231 can be formed from, e.g., brass, and the brake shoe 243 can be formed from, e.g., POM (polyoxymethylene).

The brake lever 241 is biased to rotate in a direction to press the brake shoe 243 against the outer peripheral surface of the brake drum 231 by a brake spring (extension spring/biaser) 244. The brake lever 241 is provided, on the opposite side of the brake lever shaft 242 with respect to the brake shoe 243, with a brake release projection 245, and is further provided in the vicinity of the brake shoe 243 with a brake control recess (brake commencement timing setter) 246 for controlling the timing of the commencement of application of the brake (brake shoe 243) to the brake drum 231. The brake release projection 245 and the brake control recess 246 are engageable with a brake release lever 361 and a mirror-drive-spring charge lever 321 of the mirror drive unit 300 in order to control the position of the brake lever 241.

[Mirror Drive Unit 300]

Figure 4:
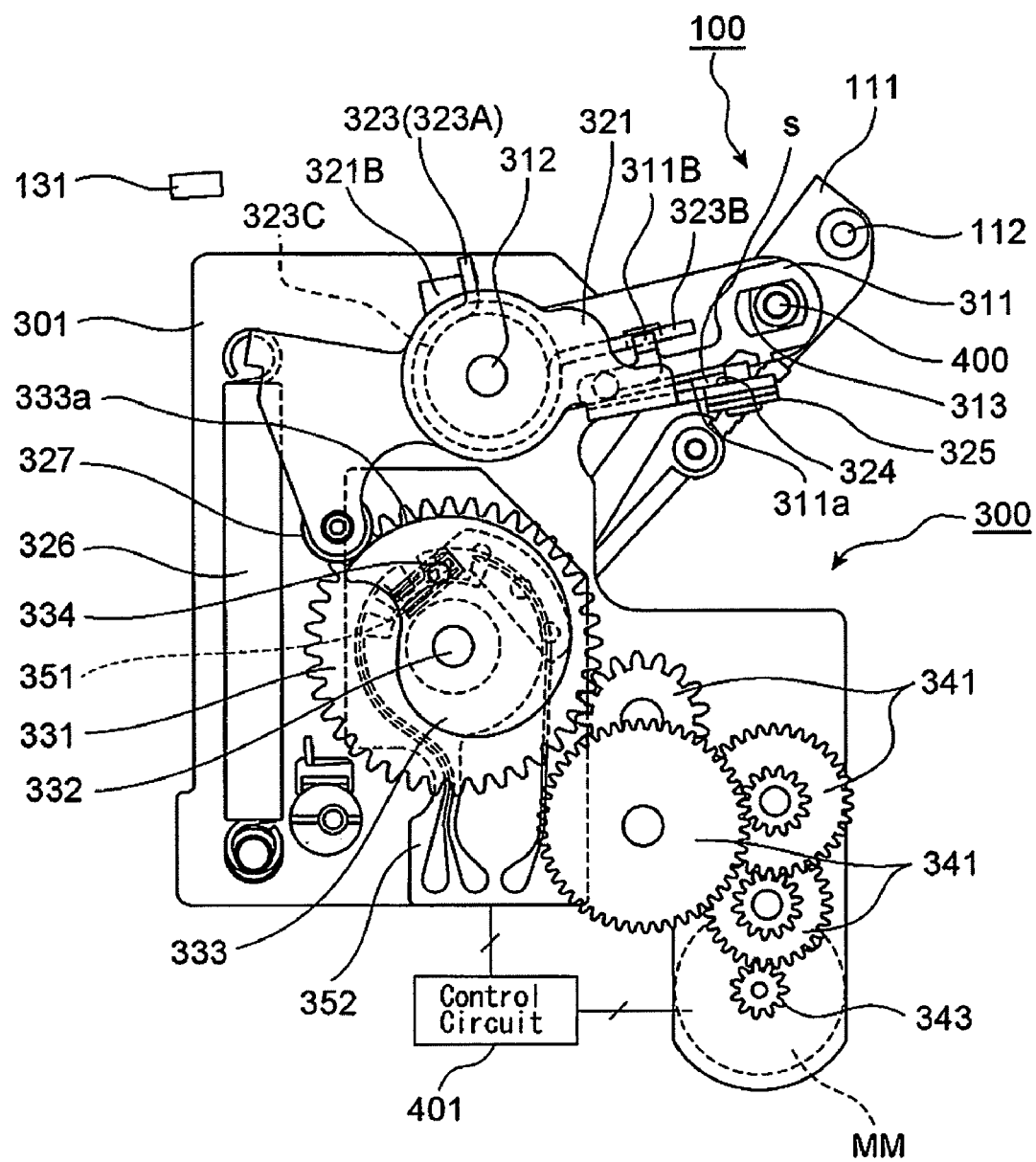
FIG. 4 is a side elevational view of the mirror drive apparatus, showing the embodiment of the mirror unit shown in FIGS. 1 and 3 and an embodiment of the mirror drive unit in a mirror-down position with the mirror brake unit removed from the mirror drive apparatus.
Figure 5:
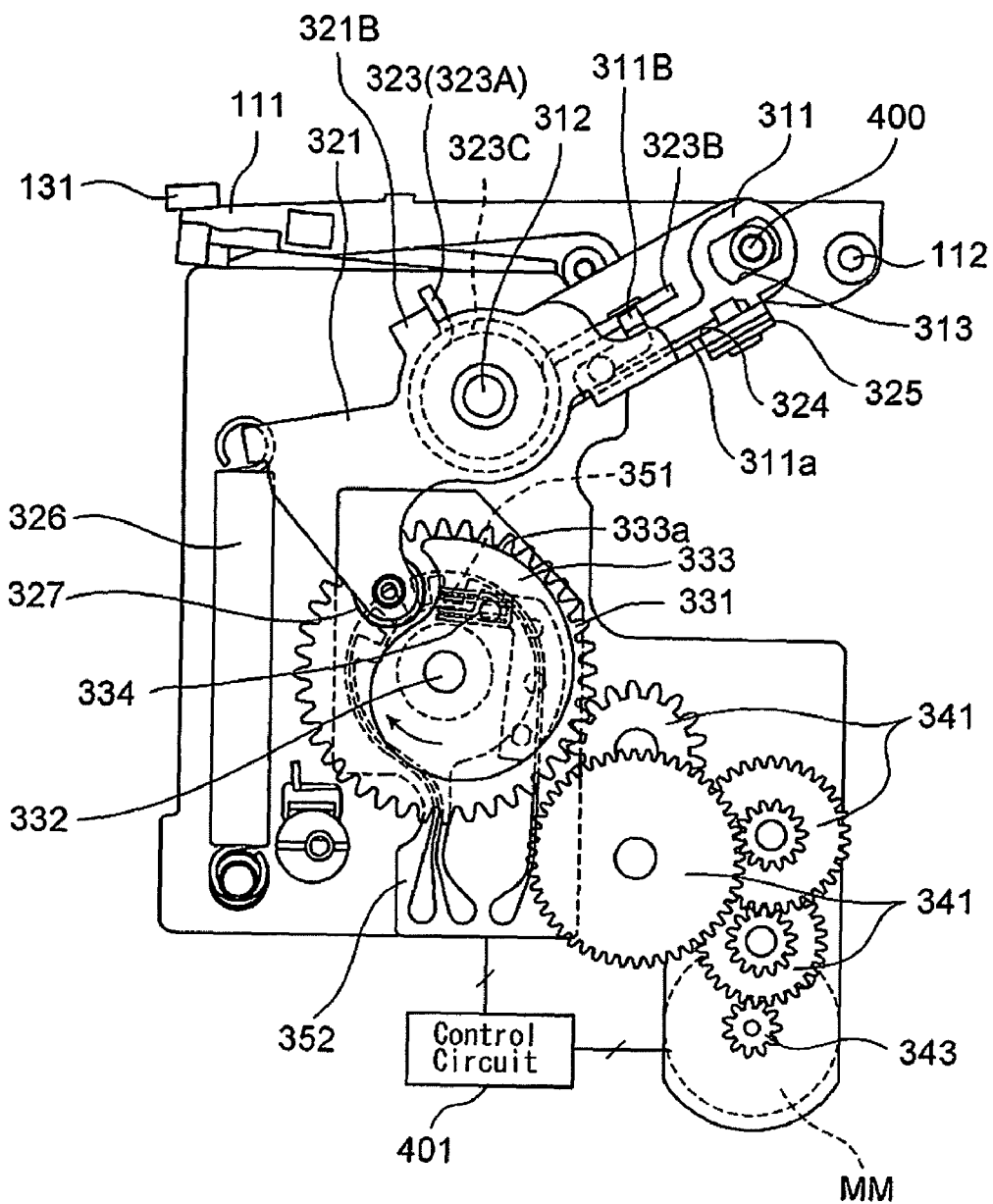
FIG. 5 is a side elevational view of the mirror unit and the mirror drive unit shown in FIG. 4 in a mirror-up state.

The mirror drive unit 300 is positioned between the mirror unit 100 and the mirror brake unit 200 in a state where the mirror drive apparatus (100, 200 and 300) is installed in the camera body (not shown). As shown in FIGS. 4 and 5, the mirror drive unit 300 is provided with a side plate 301 which forms the right side wall of the mirror box as viewed from the front, and each component of the mirror drive unit 300 other than the side plate 301 is mounted to an outer side of the side plate 301.

The mirror drive lever 311 and the mirror-drive-spring charge lever 321 are pivoted about a lever pivot shaft 312 that is fixed to the side plate 301 to be coaxially rotatable relative to each other, and a cam gear 331 on which a mirror control cam 333 is integrally formed is supported by a cam gear shaft 332 to be freely rotatable thereon. The cam gear shaft 332 is fixed to the side plate 301. The mirror drive shaft 400 of the mirror unit 100 is engaged in an elongated hole 313 which is formed at one end (right end with respect to FIG. 5) of the mirror drive lever 311. A swing motion of the mirror drive lever 311 about the lever pivot shaft 312 between a mirror-down position and a mirror-up position causes the mirror seat 111 to move between the viewing position and the retracted position.

The mirror-drive-spring charge lever 321 and the mirror drive lever 311 are connected to each other via a connecting spring (torsion spring) 323 and rotate together at normal times. Specifically, as shown in FIGS. 4 and 5, a coiled portion 323C of the connecting spring 323 is fitted on the lever pivot shaft 312, and two arms 323A and 323B formed at both ends of the of the connecting spring 323 are positioned between a spring hook portion 321B of the mirror-drive-spring charge lever 321 and a spring hook portion 311B of the mirror drive lever 311 to be hooked thereon, respectively, so that the mirror-drive-spring charge lever 321 and the mirror drive lever 311 are biased to rotate by the connecting spring 323 in directions to make an engaging piece 324 which is formed on the mirror-drive-spring charge lever 321 and a contacting portion 311a which is formed on the mirror drive lever 311 engage with each other. In a state where one of the mirror-drive-spring charge lever 321 and the mirror drive lever 311 is prevented from rotating, a rotation of the other of the mirror-drive-spring charge lever 321 and the mirror drive lever 311 in a direction to make the engaging piece 324 and the contacting portion 311a move away from each other causes the connecting spring 323 to be overcharged.

The mirror drive unit 300 is provided, on a collared portion of the mirror-drive-spring charge lever 321 which is formed by bending part of the mirror-drive-spring charge lever 321 in a direction orthogonal to a plane in which the mirror-drive-spring charge lever 321 rotates, with an adjustment washer (adjustment spacer/shim/brake commencement timing setter) 325 which is fixed to the collared portion by a set screw. In a state where the mirror brake unit 200 and the mirror drive unit 300 are combined, the adjustment washer 325 acts as an engaging portion which prevents the brake lever 241 from rotating in a brake-actuating direction by engaging with the brake control recess 246 of the brake lever 241 that is biased to rotate by the brake spring 244 (see FIGS. 6 and 7). The adjustment washer 325 consists of one or more washers, can be adjusted in thickness by changing a combination of washers having different thicknesses, and constitutes a brake timing adjuster for adjusting the timing of contact of the brake shoe 243 of the brake lever 241 with the brake drum 231.

One end of the mirror drive spring 326 is engaged with the mirror-drive-spring charge lever 321 at an end thereof on the opposite side of the lever pivot shaft 312 with respect to the engaging piece 324. The other end of the mirror drive spring 326 is engaged with the side plate 301 to continuously bias the mirror-drive-spring charge lever 321 to rotate in the mirror-up direction. In addition, a cam roller 327 is supported on the mirror-drive-spring charge lever 321 at an end thereof on the opposite side of the lever pivot shaft 312 with respect to the engaging piece 324 to be freely rotatable on the axis of the cam roller 327. The cam roller 327 limits the rotation of the mirror-drive-spring charge lever 321 by engaging with a peripheral cam surface 333a of the mirror control cam 333 to control the charging and releasing of the mirror drive spring 326.

Figure 11:
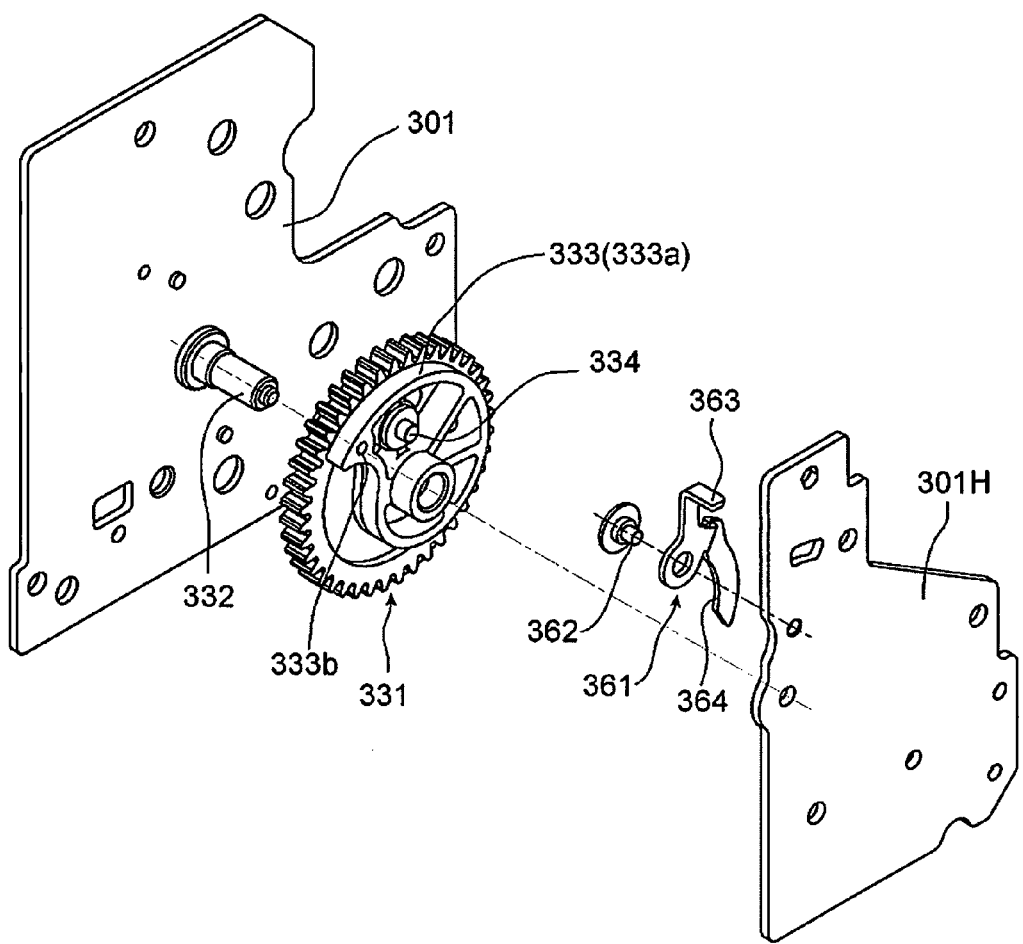
FIG. 11 is an exploded perspective view of the mirror drive unit, showing a manner of supporting a mirror control cam and a brake release lever of the mirror drive unit.
Figure 14:
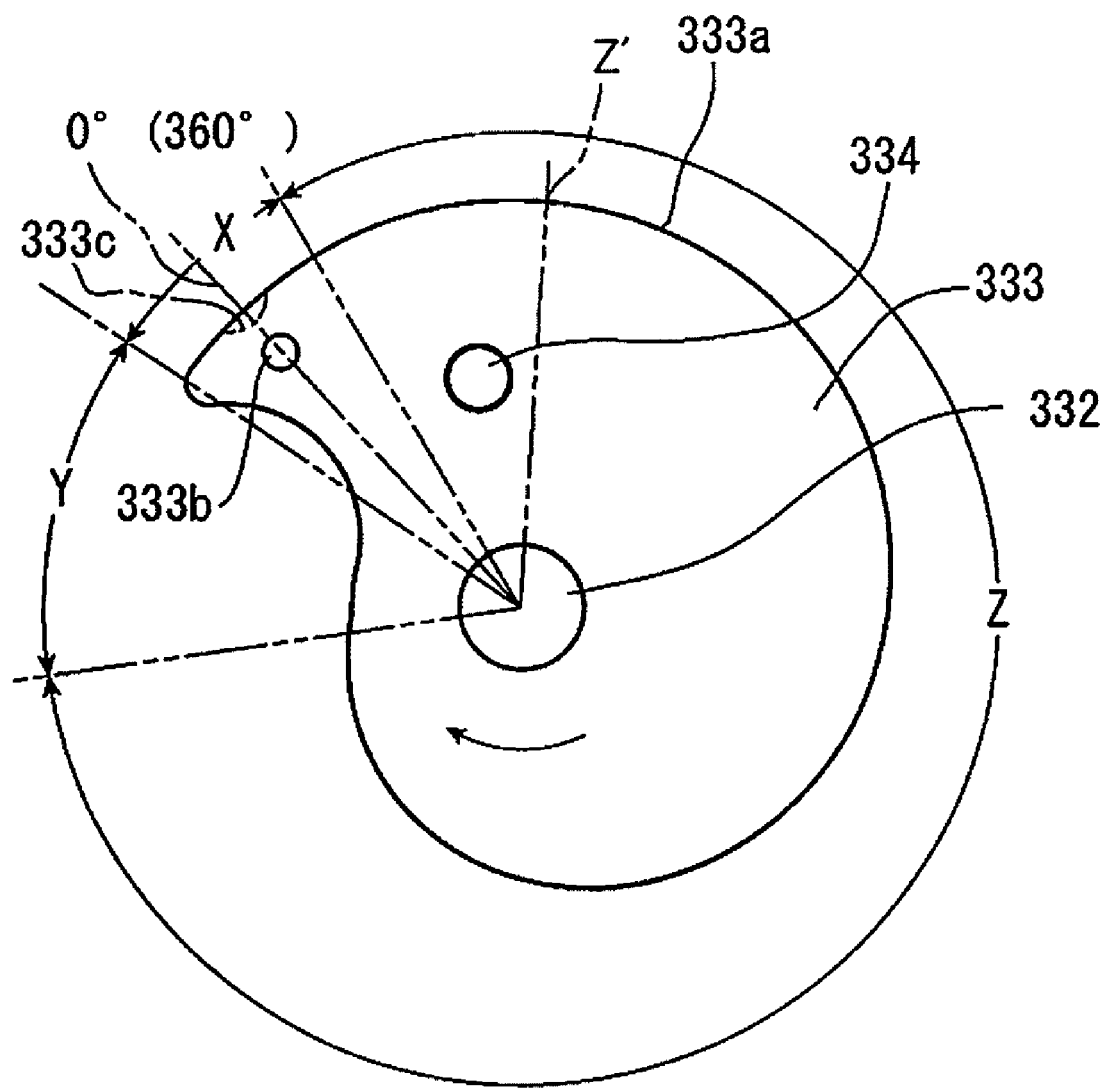
FIG. 14 is a front elevational view of the mirror control cam, showing the shape thereof.

The mirror control cam 333 that is made from a plate cam is a single-rotation cam which performs a sequence of operations (mirror up/down cycle) by rotating by a single rotation (360 degree rotation) via the cam roller 327, which rolls on the peripheral cam surface 333a, and the mirror-drive-spring charge lever 321, which rotatably supports the cam roller 327. In the present embodiment, the peripheral cam surface 333a is formed in the shape of a cycloid about the cam gear shaft 332, and a single rotation of the peripheral cam surface 333a causes the charged mirror drive spring 326 to be released, the mirror 101 to move up to the retracted position, the mirror 101 to be held in the retracted position, the mirror drive spring 326 to be charged, the mirror 101 to move down to the viewing position, and the mirror 101 to be held in the viewing position. FIG. 14 shows the shape (contour) of the peripheral cam surface 333a of the mirror control cam 333. The peripheral cam surface 333a includes a viewing position (mirror-down position) holding section X that is formed as a concentric arc section (maximum radius section) centered about and concentric with the cam gear shaft 332. Next to the viewing position holding section X, the peripheral cam surface 333a includes a charge-release/mirror-up/mirror-up-position-holding section (small diameter portion/minimum radius section) Y and a charge/mirror-down section (charging section) Z in that order in the rotation direction of the mirror control cam 333. The mirror control cam 333 is provided in the viewing position (mirror-down position) holding section X with a rotation reference position (zero degree position; see FIG. 12). This zero degree position designates a position to stop the mirror control cam 333 at a charging position at which the mirror drive spring 326 completes charging (being fully extended) by the mirror-drive-spring charge lever 321. To allow this rotation reference position to be visible during assembly, the mirror control cam 333 is provided on a side thereof with a rotation position reference index 333b (which appears in FIG. 11 also) representing the rotation reference position. The operation of the mirror control cam 333 is controlled so that the cam roller 327 stops at the zero degree position. A roller holding recess 333c (shown by a two-dot chain line in FIG. 14) which allows the cam roller 327 to be engaged therein to hold the mirror-drive-spring charge lever 321 at the charging position is formed on the peripheral cam surface 333a to correspond to the zero degree position (the rotation position reference index 333b). The mirror-drive-spring charge lever 321 constitutes a brake lever control mechanism which brings the brake shoe 243 of the brake lever 241 to be pressed against and disengaged from the brake drum 231 by a single rotation of the mirror control cam 333.

A mirror motor MM is connected to the cam gear 331 via a reduction gear train 341 and a pinion 343 fixed to the rotational shaft of the mirror motor MM. Rotation of the rotational shaft of the mirror motor MM is transmitted from the pinion 343 to the cam gear 331 via the reduction gear train 341. The mirror drive unit 300 is provided with a code brush 351 which is mounted on the side of the cam gear 331 which faces the side plate 301. The mirror drive unit 300 is further provided with a code plate 352 having a land (land pattern) which is fixed to the side plate 301. The land of the code plate 352 is formed along the path of the code brush 351, so that the code brush 351 slides on the code plate 352 when the cam gear 331 rotates relative to the side plate 301. Rotational positions (the mirror-up position and the mirror-down position) of the cam gear 331 are detected via a combination of the code brush 351 and the code plate 352. The code plate 352 and the mirror motor MM are connected to a control circuit 401 (see FIGS. 4 and 5). The control circuit 401 controls the operation of the mirror motor MM in accordance with the position of the mirror control cam 333 which is detected via the code plate 352 and the code brush 351.

The mirror drive unit 300 is provided, between the side plate 301 and a supplemental plate 301H (see FIG. 11) parallel to the side plate 301, with the aforementioned brake release lever 361 which is pivoted about a pivot 362 that is fixedly supported onto the inner side of the supplemental plate 301H to be disposed between the side plate 301 and the supplemental plate 301H. The brake release lever 361 is not shown in FIGS. 4 and 5 though the brake release lever 361 is an element of the mirror drive unit 300. The brake release lever 361 is provided with a brake release arm 363 that is engageable with the brake release projection 245 of the mirror brake unit 200. The brake release lever 361 is further provided, on the opposite side of the pivot 362 with respect to the brake release arm 363 with a cam portion (cam surface) 364 (see FIGS. 6 through 11) which extends in a plane orthogonal to the axis of rotation (the cam gear shaft 332) of the mirror control cam 333. The mirror control cam 333 is provided, at a position eccentric from the axis of the cam gear shaft 332, with a brake release pin 334 which projects in a direction parallel to the axis of rotation (the cam gear shaft 332) of the mirror control cam 333. The mirror control cam 333 rotates the brake release lever 361 in a brake releasing direction via engagement of the brake release pin 334 with the cam portion 364 against the biasing force of the brake spring 244.

The mirror unit 100, the mirror brake unit 200 and the mirror drive unit 300 are constructed independently of one another in advance and are installed in the camera body (not shown) upon assembly. The mirror brake unit 200 is normally mounted to the mirror unit 100 after the mirror drive unit 300 is mounted to the mirror unit 100. The mirror brake unit 200 is disposed at a position where the axis of the mirror rotational shaft 112 is aligned with the axis of the brake shaft 212 of the sector gear 211. The mirror drive shaft 400 is engaged in the elongated hole 213 of the sector gear 211 through the elongated hole 313 of the mirror drive lever 311, and the mirror unit 100, the mirror brake unit 200 and the mirror drive unit 300 are linked with one another via the mirror drive shaft 400. In addition, the brake lever shaft 242 is positioned coaxially with the lever pivot shaft 312, the brake release arm 363 and the cam portion 364 of the brake release lever 361 face the brake release projection 245 of the brake lever 241 and the brake release pin 334 of the mirror control cam 333, respectively, and the adjustment washer 325 of the mirror-drive-spring charge lever 321 is engaged with the brake control recess 246 of the brake lever 241 (see FIGS. 6 through 10).

Figure 12:
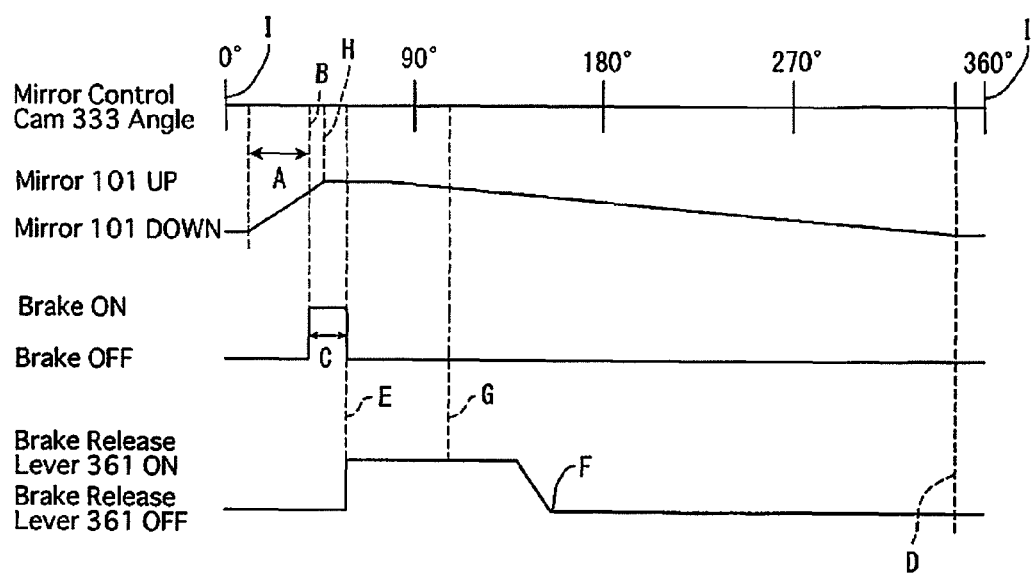
FIG. 12 is a timing chart showing the timings of the mirror up/down operation of the quick-return mirror and the brake ON/OFF operation that are performed by operations of the brake release lever in association with the angle of rotation of the mirror control cam of the mirror drive unit of the mirror drive apparatus.
Figure 13:
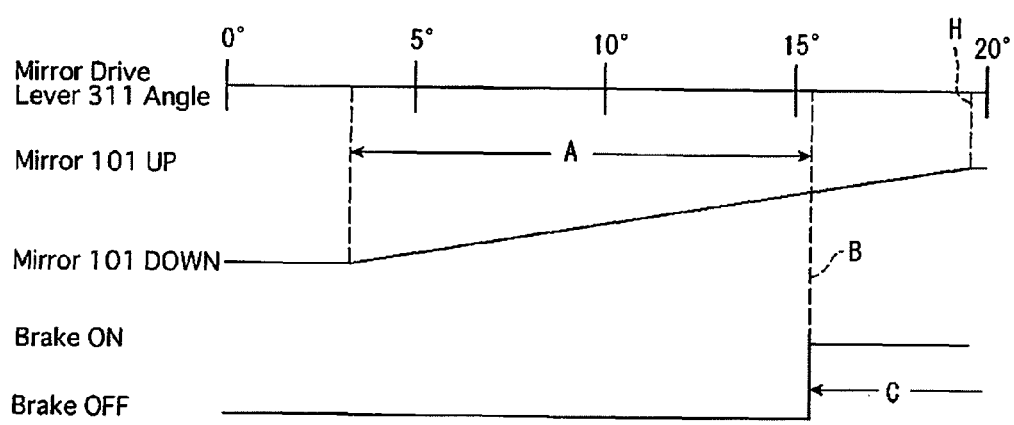
FIG. 13 is a timing chart showing the timings of the mirror up/down operation of the quick-return mirror and the brake ON/OFF operation in association with the angle of rotation of a mirror drive lever of the mirror drive unit.

Operations of the mirror drive apparatus in an assembled state will be hereinafter discussed with reference to FIGS. 6 through 10, 12 and 13. FIG. 12 is a timing chart showing the timings of the mirror up/down operation of the mirror 101 and the brake ON/OFF operation (contacting/separating operation of the brake lever 241 relative to the brake drum 231) that are performed in association with the angle of rotation of the mirror control cam 333 and the operation of the brake release lever 361. FIG. 13 is a timing chart showing the timings of the mirror up/down operation of the mirror 101 and the brake ON/OFF operation in association with the angle of rotation of the mirror drive lever 311. In the timing charts of FIGS. 12 and 13, the mirror control cam 333 at a zero degree angle and the mirror drive lever 311 at a zero degree angle designate the initial positions thereof in which the mirror 101 is held in the viewing position (mirror-down position). The mirror control cam 333 only rotates one way, rotating through 360 degrees from the initial position of a zero degree angle to the initial position of a zero degree angle; however, the mirror drive lever 311 swings once between the zero degree position and an approximately 20 degree position while the mirror control cam 333 rotates by a single rotation from the zero degree position to the 360 degree position.

Figure 6:
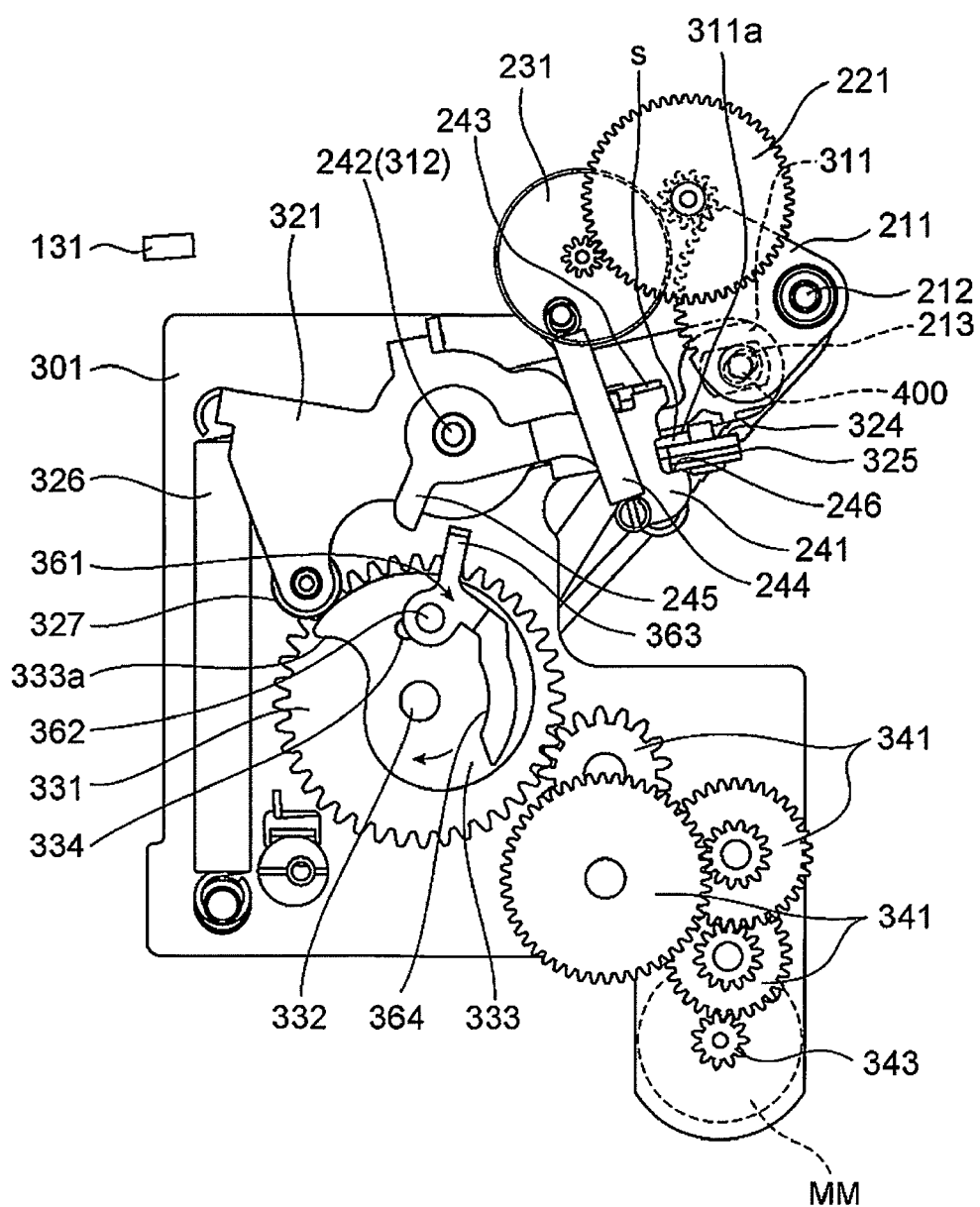
FIG. 6 is a side elevational view of the mirror drive apparatus in a mirror-down position.
Figure 7:
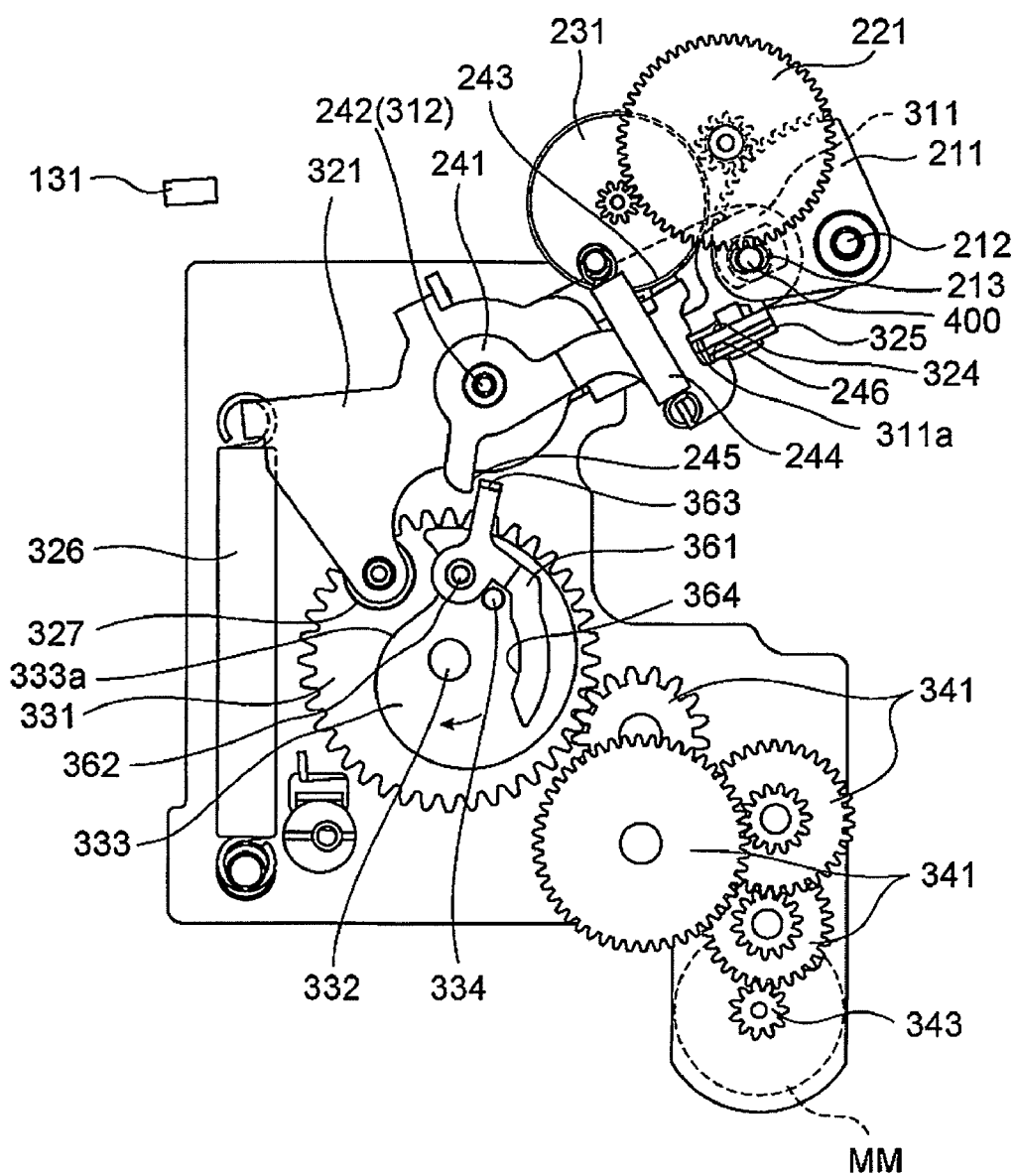
FIG. 7 is a side elevational view of the mirror drive apparatus, showing a mirror brake commencement position during an upward movement of the quick return mirror.

When the mirror 101 is held at the viewing position, the cam roller 327 is positioned in the charge completion range (the viewing position holding section X) of the mirror control cam 333 as shown in FIG. 6, the mirror-drive-spring charge lever 321 is held at the charging position, in which the mirror drive spring 326 is charged (fully extended), and the mirror drive lever 311 is held at the mirror-down position. At this stage, the mirror seat 111 is prevented from further rotating from the viewing position, at which the mirror seat 111 comes in contact with a mirror-down stopper (not shown), so that the mirror drive lever 311 is prevented from rotating in the mirror-down direction; however, the mirror-drive-spring charge lever 321 further rotates in the mirror-down direction by the peripheral cam surface 333a so that the engaging piece 324 moves away from the contacting portion 311a to thereby create a clearances (see FIGS. 4 and 6). Accordingly, the connecting spring 323 moves into an overcharged state. Additionally, the adjustment washer 325 of the mirror-drive-spring charge lever 321 holds the brake shoe 243 in a position (the brake releasing position) spaced away from the brake drum 231 via engaging in the brake control recess 246. When the mirror seat 111 is in contact with the mirror-down stopper, the cam roller 327 of the mirror-drive-spring charge lever 321 is in contact with a viewing position starting end Z' (see FIG. 14) of the mirror control cam 333. The viewing position starting end Z' is a specific position in the charging section Z in the vicinity of the viewing position holding section X, and the overcharging of the connecting spring 323 proceeds from this time (position) onwards.

Upon the mirror motor MM being actuated (i.e., upon a shutter release) when the mirror 101 is in the viewing position, the mirror control cam 333 rotates clockwise with respect to FIG. 6 together with the cam gear 331 that is rotated via the reduction gear train 341. In an initial stage of the rotation of the mirror control cam 333, the cam roller 327 drops to the mirror-up-position holding section (charge-release section/minimum radius section) Y radially inwards from the charge completion range (the viewing position holding section X) of the peripheral cam surface 333a. Upon the cam roller 327 dropping down to mirror-up-position holding section Y, the constraint of the cam roller 327 is instantly released to thereby release the mirror-drive-spring charge lever 321. Thereupon, the mirror-drive-spring charge lever 321 rotates toward the mirror-up position (counterclockwise with respect to FIGS. 4 through 10) by the resilient tensile force (resiliency) of the mirror drive spring 326. Furthermore, the control circuit 401 detects via the code brush 351 and the code plate 352 that a rotation of the mirror control cam 333 has caused the cam roller 327 to move out of the viewing position holding section X of the mirror control cam 333. Upon this detection, the control circuit 401 stops the mirror motor MM instantaneously.

The rotation of the mirror-drive-spring charge lever 321 toward the mirror-up position causes the mirror drive lever 311 to swing with the mirror-drive-spring charge lever 321 about the lever pivot shaft 312, thus causing the mirror seat 111 to swing instantaneously toward the retracted position via the mirror drive shaft 400 (section A in FIG. 12 and section A in FIG. 13). This movement of the mirror 101 from the viewing position to the retracted position is carried out swiftly by the spring force of the mirror drive spring 326. The actual time (mirror-up time) it takes for the mirror 101 to move from the viewing position to the retracted position can be adjusted by adjusting the strength of the mirror drive spring 326. However, if the spring force of the mirror drive spring 326 is excessively large, the shock produced upon the mirror 101 being retracted to the retracted position becomes correspondingly large. Accordingly, the strength of the mirror drive spring 326 is determined in consideration of the retracting speed of the mirror 101, the shock that is produced and also the sequence of operations of the entire camera system.

Concurrently with this movement of the mirror 101 toward the retracted position, the sector gear 211 also rotates toward the retracted position (clockwise with respect to FIGS. 6 through 10) since the mirror drive shaft 400 is engaged in the elongated hole 213 of the sector gear 211. This rotation of the sector gear 211 toward the retracted position causes the brake drum 231 to rotate at a high speed via the speed-up gear 221.

The rotation of the mirror-drive-spring charge lever 321 toward the mirror-up position causes the brake lever 241, which is biased to rotate in a brake applying direction by the resilient biasing force of the brake spring 244 so that the brake control recess 246 presses the adjustment washer 325, to swing in a brake applying direction following the rotation of the mirror drive lever 311. Subsequently, immediately before the completion of the mirror-up operation of the mirror 101, the brake shoe 243 of the brake lever 241 is applied against the brake drum 231 to thereby start braking the brake drum 231, and the adjustment washer 325 commences disengagement from the brake control recess 246 (see FIG. 7, point B in FIG. 12, point B in FIG. 13). The adjustment washer 325 serves as a member for adjusting (setting) the timing of this commencement of the application of the brake shoe 243 of the brake lever 241 against the brake drum 231. This timing is advanced if the thickness of the whole adjustment washer 325 is decreased and retarded if the thickness of the whole adjustment washer 325 is increased.

Further rotation of the mirror drive lever 311 toward the mirror-up position causes the adjustment washer 325 to be disengaged from the brake control recess 246, so that the action of brake application to the brake drum 231 continues (see section C in FIG. 12 and section C in FIG. 13). Namely, this action of brake application holds down the swing movement of the sector gear 211 via the speed-up gear 221, thus rapidly reducing the swing speed of the mirror seat 111 toward the retracted position via the mirror drive shaft 400. Thereupon, the mirror seat 111 slows down and then bumps against the mirror-up stopper 131 to stop at the retracted position (see FIG. 8, point H in FIG. 12, point H in FIG. 13).

Figure 8:
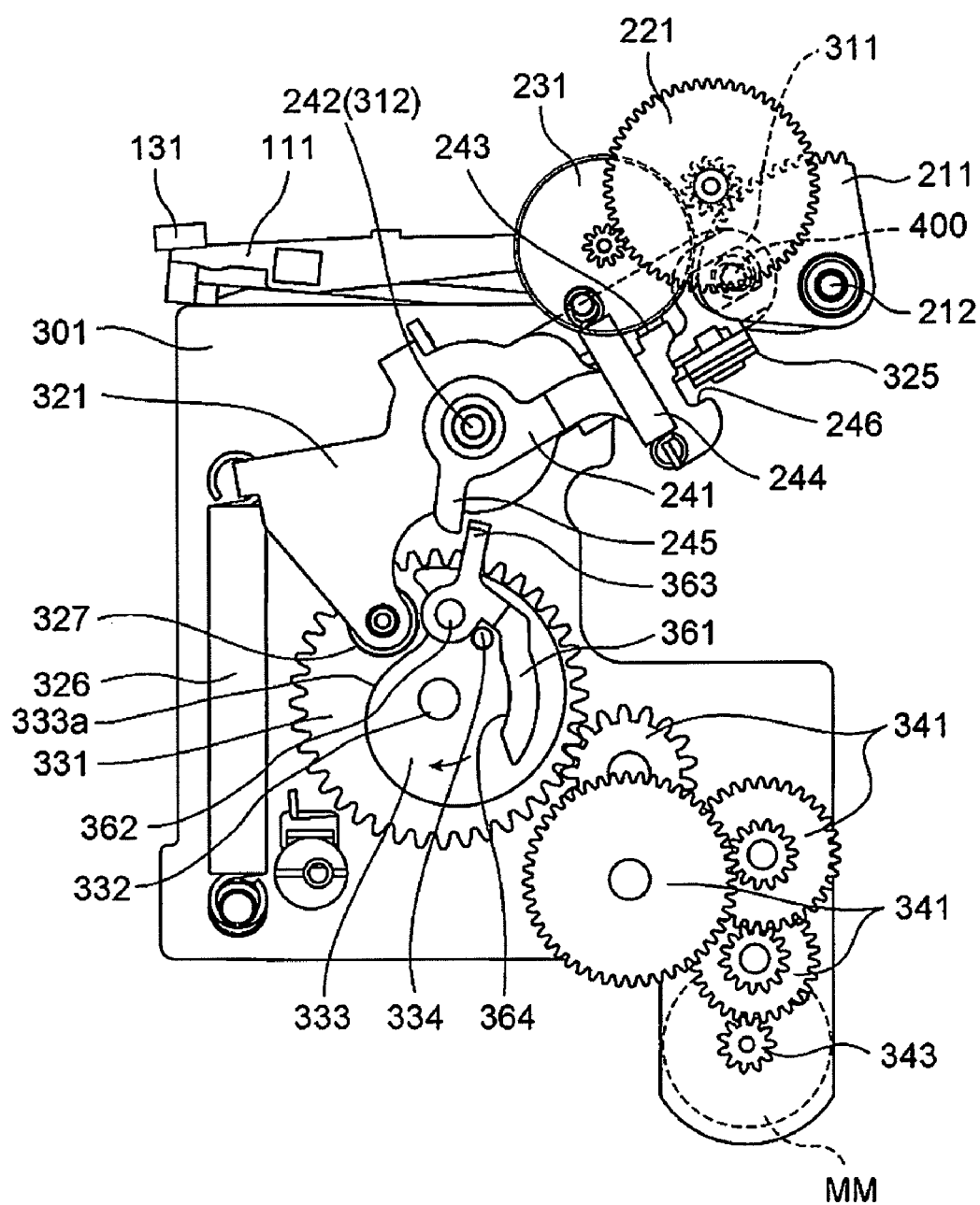
FIG. 8 is a side elevational view of the mirror drive apparatus, showing a state thereof in the mirror-up position.

In a state where the mirror seat 111 is at rest in the retracted position and the mirror control cam 333 is at a standstill, the mirror-drive-spring charge lever 321 is at rest in the mirror-up position, at which the cam roller 327 has dropped down into the mirror-up position holding section (small radius section/ minimum radius section) Y of the peripheral cam surface 333a of the mirror control cam 333 and is disengaged from the peripheral cam surface 333a (see FIG. 8). Accordingly, the mirror seat 111 remains still in the retracted position while being pressed against the mirror-up stopper 131 via the mirror-drive-spring charge lever 321, which is biased to rotate by the resilient biasing force of the mirror drive spring 326, the mirror drive lever 311 and the mirror drive shaft 400, and while being braked by the brake drum 231 which is prevented from rotating by the frictional force created between the brake drum 231 and the brake shoe 243 pressed against the brake drum 231 by the resilient biasing force of the brake spring 244 (see FIG. 8). In such a state where the mirror 101 is held in the retracted position, an exposure/photographing process (image capturing process) is performed.

The brake release lever 361 releases the braking effect that is applied to the brake drum 231 by the brake lever 241 at a specific rotational phase (position) of the mirror control cam 333 regardless of the position of the mirror-drive-spring charge lever 321 (point E in FIG. 12). Upon completion of the exposure/photographing process (image capturing process), the control circuit 401 again actuates the mirror motor MM to rotate the mirror control cam 333 in the clockwise direction. This clockwise rotation of the mirror control cam 333 causes the brake release pin 334 to come in slide contact with the cam portion 364 to make the brake release lever 361 swing in the brake releasing direction (counterclockwise direction with respect to FIG. 9). Thereupon, the brake release arm 363 of the brake release lever 361 comes into contact with the brake release projection 245 of the brake lever 241 to rotate the brake lever 241 in the brake releasing direction, so that the brake shoe 243 is disengaged from the brake drum 231 to thereby release the braking effect on the mirror 101 (point E in FIG. 12).

Figure 9:
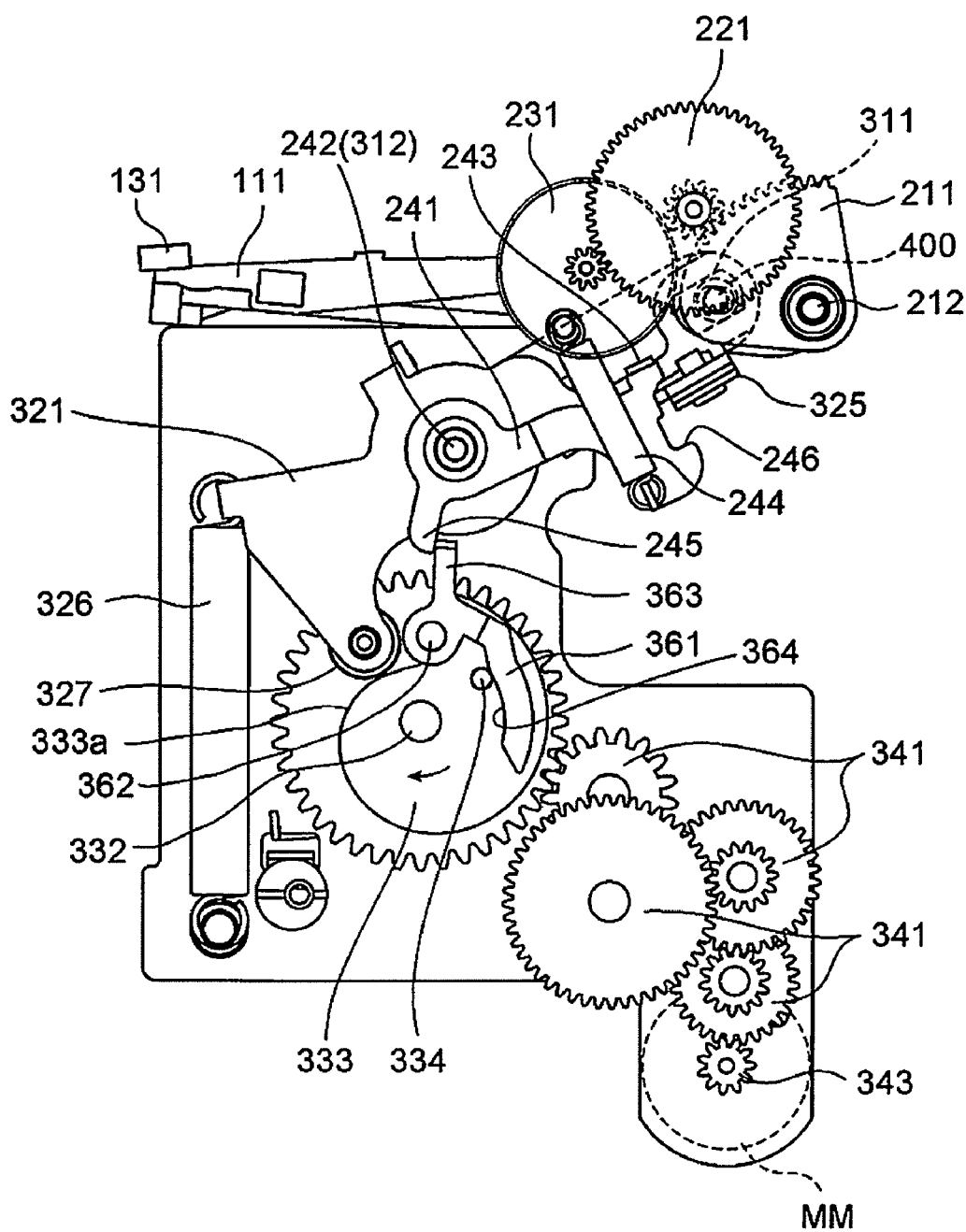
FIG. 9 is a side elevational view of the mirror drive apparatus, showing a state thereof in a mirror brake release position.
Figure 10:
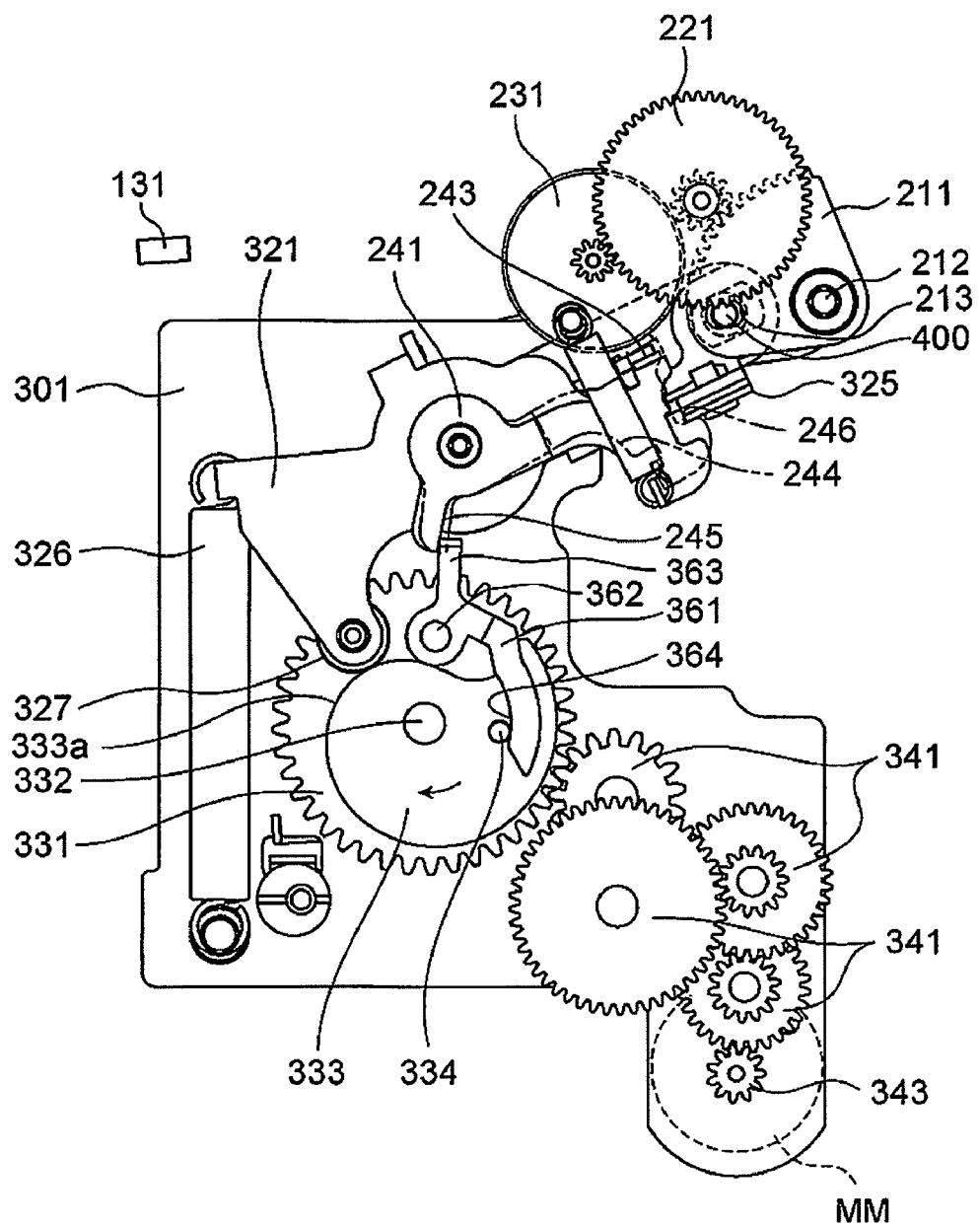
FIG. 10 is aside elevational view of the mirror drive apparatus, showing a state thereof during a downward movement of the quick-return mirror (during charging of a mirror drive spring)

Further clockwise rotation of the mirror control cam 333 causes the charging section Z of the peripheral cam surface 333a to start contacting the cam roller 327 (see FIG. 9). Thereafter, further clockwise rotation of the mirror control cam 333 causes the cam roller 327 to be pressed (moved) in a direction away from the cam gear shaft 332 by the peripheral cam surface 333a of the mirror control cam 333 while rolling on the peripheral cam surface 333a, which causes the mirror-drive-spring charge lever 321 to swing in a charge direction corresponding to the mirror-down direction (clockwise direction with respect to FIGS. 4 through 10), thus causing the mirror seat 111 to swing toward the viewing position via the mirror drive lever 311 and the mirror drive shaft 400 while charging (extending) the mirror drive spring 326.

Further clockwise rotation of the mirror control cam 333 causes the brake release pin 334 to be disengaged from the cam portion 364 (point F in FIG. 12); however, by this stage the adjustment washer 325 has moved to a position so as to come in contact with the brake control recess 246 of the brake lever 241 (point F in FIG. 12). Accordingly, the brake shoe 243 maintains a brake released state in which the brake shoe 243 is disengaged from the brake drum 231. Namely, the mirror-drive-spring charge lever 321 has already released the brake (as shown by solid lines in FIG. 10) at a position (shown by two-dot chain lines in FIG. 10) where the adjustment washer 325 comes in contact with the brake control recess 246 when it is assumed that the brake release lever 361 does not exist. In this manner, by releasing the brake using the brake release lever 361 independently of the mirror-drive-spring charge lever 321 before the mirror-drive-spring charge lever 321 releases the brake, the phenomenon of interfering with motion of the mirror 101 which is ready to start moving downward is prevented from occurring, so that the mirror 101 can be made to move down smoothly. Specifically, the mirror-drive-spring charge lever 321 makes the mirror 101 move down by making the cam roller 327 enter the charging section Z of the mirror control cam 333; however, at this time if the brake shoe 243 of the brake lever 241 is in contact with the brake drum 231, the mirror 101 cannot move down smoothly and the connecting spring 323 is overcharged, and accordingly, there is a possibility of the mirror 101 moving largely to thereby produce a shock at the moment that the adjustment washer 325 of the mirror-drive-spring charge lever 321 releases the brake by contacting and pressing the brake control recess 246. In contrast, by releasing the brake using the brake release lever 361 that is a different member from the mirror-drive-spring charge lever 321, the brake is released with reliability when the mirror 101 moves down, which makes a smooth downward movement of the mirror 101 from the retracted position to the viewing position possible.

Thereafter, the cam roller 327 rolls on the charging section Z of the peripheral cam surface 333a of the mirror control cam 333, and therefore, the mirror-drive-spring charge lever 321 further rotates in the charge direction (i.e., in the mirror-down direction) to make the mirror seat 111 swing down toward the viewing position while charging the mirror drive spring 326. The mirror seat 111 enters (arrives at) the viewing position (i.e., the cam roller 327 enters (comes in contact with) the holding section X from the viewing position starting end Z' of the mirror control cam 333; point D in FIG. 12), and when the cam roller 327 has reached (advanced to) the zero degree position (point I in FIG. 12) within the holding section X, the control circuit 401 detects a position on the code plate 352 that corresponds to this zero degree position and commands (controls) the mirror control cam 333 (mirror motor MM) to stop.

The sector gear 211, the speed-up gear 221 and the brake drum 231, which have been described above, also function as a speed control mechanism (speed governor) during the time the mirror seat 111 swings between the retracted position and the viewing position (i.e., swings up and down).

The brake lever 241, the mirror-drive-spring charge lever 321 and the adjustment washer 325 constitute a linking mechanism which makes the mirror brake unit 200 brake the mirror 101 before the mirror 101 reaches the retracted position in the course of the retracting movement of the mirror 101 toward the retracted position from the viewing position.

The brake release lever 361 and the brake release pin 334 also constitute an operatively associated (detachably connectable) mechanism which determines the timing of releasing the brake shoe 243, which is applied to the mirror 101 by the mirror brake unit 200, upon or before the commencement of a swing movement of the mirror 101 toward the viewing position from the retracted position in association with rotation of the mirror control cam 333.

As described above, according to the mirror brake mechanism of an SLR camera according to the present invention, since the mirror brake unit (mirror brake mechanism) 200 is disposed on one of laterally opposite sides of the mirror 101 so that the brake shaft 212 is positionally aligned on an extension line of the axis of the mirror rotational shaft 112, and since the small gear 223, the large gear 224 of the speed-up gear 221, and the brake drum 231 that includes the small gear 233, which are driven to rotate by the sector gear 211, are all positioned in front of the brake shaft 212, the depth of the installation space for the mirror brake unit 200 can be small, which makes miniaturization of the camera body possible.

Additionally, the mirror brake mechanism of an SLR camera according to the present invention is structured so that the brake shaft 212 of the mirror brake unit 200, which operates to brake upward movement of the mirror seat 111, is provided as a separate member from the mirror rotational shaft 112 and so that the mirror brake unit 200 is installed to make the axis of one of the brake shaft 212 and the mirror rotational shaft 112 substantially coincide with an extension line of the axis of the other, the mirror brake unit 200 can be mounted to the mirror unit 100 in an easy manner because it is not required to bring one gear into engagement with another gear when the mirror brake unit 200 is mounted to the mirror unit 100. Moreover, as compared even with the case where one gear needs to be engaged with another gear when the mirror brake unit 200 is installed in a camera body, tolerances in dimensional error of elements/parts and assembly error are increased, facilitating assembly of the mirror brake mechanism. Furthermore, since all the elements of the mirror brake unit 200 are mounted to the single brake mount plate 201 as a unit, the mirror brake unit 200 itself is easy to assemble and it is also easy to install the mirror brake unit 200 in a camera body.

Although the present invention has been described based on the above illustrated embodiment, the present invention is not limited solely to this particular embodiment; making various modifications to the above illustrated embodiment is possible.

For instance, the sector gear 211 that serves as the interlocking rotating member can be formed from two separate parts: a lever member having an elongated hole in which the mirror drive shaft 400 is engaged, and a gear member which rotates integrally with the lever member in association with the brake drum 231. By forming the interlocking rotating member from two separate parts such as the lever member and the gear member, the degree of freedom in part shape and placement increases.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A mirror brake mechanism of an SLR camera for applying a brake to a mirror pivoted about a mirror rotational shaft to be swingable between a viewing position, in which light traveling from a photographing optical system is incident on said mirror and reflected toward a viewfinder optical system, and a retracted position, in which the light traveling from said photographing optical system is incident on an image sensor without being reflected by said mirror, said mirror brake mechanism comprising:
a brake shaft which is independent of said mirror rotational shaft and positionally aligned along an extension line of said mirror rotational shaft;
an interlocking rotating member disposed on one of laterally opposite sides of said mirror and rotatable about said brake shaft;
a mirror drive shaft which connects a mirror seat, on which said mirror is mounted, and said interlocking rotating member to each other, said mirror drive shaft configured to allow said mirror seat and said interlocking rotating member to rotate around an axis of said brake shaft;
a brake drum which rotates in association with said interlocking rotating member; and
a mirror brake member which is brought into contact with and disengaged from said brake drum.

2. The mirror brake mechanism according to claim 1, wherein said interlocking rotating member, said brake drum and said mirror brake member are disposed on said one of said laterally opposite sides of said mirror.

3. The mirror brake mechanism according to claim 1, wherein said interlocking rotating member comprises an elongated hole elongated in a radial direction of said interlocking rotating member, and
wherein said mirror drive shaft is connected to a lateral side of said mirror seat and is inserted into said elongated hole of said interlocking rotating member.

4. The mirror brake mechanism according to claim 3, wherein said interlocking rotating member comprises a sector gear, and
wherein said mirror brake mechanism comprises a speed-up gear train that is disposed between said sector gear and said brake drum.

5. The mirror brake mechanism according to claim 1, wherein said mirror brake member comprises a brake lever that is swingable between a brake applying position in which a brake shoe fixed to one end of said brake lever is pressed against said brake drum to brake said brake drum and a brake release position in which said brake shoe is disengaged from said brake drum, and
wherein said mirror brake mechanism further comprises a brake spring which biases said brake lever toward said brake applying position.

6. The mirror brake mechanism according to claim 1, further comprising a mirror drive unit which swings said mirror via said mirror drive shaft.

7. The mirror brake mechanism according to claim 6, wherein said mirror drive unit comprises an operatively associated mechanism which operates in association with said mirror drive unit to prevent said mirror brake member from applying a brake to said brake drum when said mirror is in said viewing position, to brake said brake drum before said mirror reaches said retracted position when said mirror swings from said viewing position to said retracted position, and to release said brake from said brake drum applied via said mirror brake member before said mirror commences to swing when said mirror swings from said retracted position to said viewing position.

8. The mirror brake mechanism according to claim 1, wherein axes of said brake shaft, said mirror drive shaft and said brake drum are parallel to one another.

9. The mirror brake mechanism according to claim 1, wherein said axis of said brake shaft is aligned with an axis of said mirror rotational shaft.

10. The mirror brake mechanism according to claim 1, wherein an axis of said mirror drive shaft is parallel to and not coaxially aligned with said axis of said brake shaft.

11. The mirror brake mechanism according to claim 1, wherein said brake shaft, a gear train engaged with said interlocking rotating member, said brake drum, and said mirror brake member are mounted to a brake mount plate.

* * * * *